United States Patent [19]

Politis et al.

[11] Patent Number: 4,692,765

[45] Date of Patent: Sep. 8, 1987

[54] ADAPTIVE LEARNING CONTROLLER FOR SYNTHETIC APERTURE RADAR

[75] Inventors: Demetrios T. Politis; William H. Licata, both of Ann Arbor, Mich.

[73] Assignee: Environmental Research Institute of Michigan, Ann Arbor, Mich.

[21] Appl. No.: 805,186

[22] Filed: Dec. 5, 1985

[51] Int. Cl.⁴ .................. G01S 13/86; G01S 13/90; G01C 21/16

[52] U.S. Cl. ................................. 342/106; 342/25; 364/453

[58] Field of Search .............. 343/5 CM, 5 DP, 5 ST, 343/8, 5 PL, 5 MM; 364/453, 456; 342/25, 106

[56] References Cited

U.S. PATENT DOCUMENTS 4,589,610 5/1986 Schmidt ........................ 244/3.19

Primary Examiner—T. H. Tubbesing
Assistant Examiner—Gilberto Barrón, Jr.
Attorney, Agent, or Firm—Krass & Young

[57] ABSTRACT

An adaptive learning controller (ALC) for use with an inertial navigation system (INS). To correct quadratic position errors which result from acceleration bias errors, the ALC produces a position correction signal. The position correction signal is generated by twice integrating an acceleration correction signal produced by the ALC. The ALC receives signals which indicate a current system state based on the corrected position signal and the velocity bias signal. The ALC also receives a failure signal determined by comparing the corrected position signal to predetermined failure criteria, these criteria relating to excursions of the corrected position signals beyond acceptable error limits.

7 Claims, 5 Drawing Figures

4,692,765

ADAPTIVE LEARNING CONTROLLER FOR SYNTHETIC APERTURE RADAR

This invention was made with Government support under AFOSR Contract F49620-82-C-0097 awarded by the United States Air Force. The U.S. Government has certain rights in this invention.

FIELD OF THE INVENTION

This invention relates to adaptive control systems and more particularly to an adaptive learning control system for correcting the measured position of a stablized platform system carrying a mobile radar sensor, where the position measurement system is subject to bias errors.

BACKGROUND OF THE INVENTION

Inertial navigation systems (INS) are often used to establish the position of a mobile vehicle with respect to an arbitrary starting point. An INS uses a stablized platform attached to the vehicle to detect accelerations experienced by the vehicle. The navigation computer integrates accelerations with respect to time, producing velocity estimates. Integrating these velocity estimates, in turn, with respect to time produces position estimates. Because of the chain of integrations, any bias error in the measurement of the accelerations causes a quadratic error in the position measurement.

The vehicle carrying the stablized platform has its own dynamic response which can be both timevarying and non-linear. This dynamic response obviously affects the accelerations measured by the inertial navigation system. Among the effects caused by this time-varying non-linear dynamic response are the possible introduction of bias errors into the accelerations measured by the inertial navigation system or the masking of bias errors by inertial sensor imperfections.

An example of a time-varying, non-linear system is the inertial navigation system (INS) used to determine the position of an airplane. Of particular interest are applications where data are collected by sensors aboard the aircraft and the interpretation of the data depends upon an accurate knowledge of the true position of the aircraft relative to a fixed earth coordinate system Aircraft-mounted synthetic aperture radar (SAR) systems are examples of such applications.

In a typical SAR application, an aircraft attempts to follow a prescribed trajectory with respect to the ground. At the same time, a sensor in the SAR makes coherent measurements of the radar range to targets generally disposed in directions perpendicular to the direction of travel. These radar measurements are processed onboard the aircraft or recorded on magnetic tape, along with the INS-measured position of the aircraft, for processing later. Any errors in the measurements of position exceeding a certain level lead to distortions in the image formation by the SAR processor. Alternate means can be used to make corrections for inaccuracies in the position measurements resulting from the inevitable failure of the aircraft to exactly follow some intended trajectory. However, because the measurements made by the SAR are subject to the time-varying non-linear dynamic response of the aircraft and sensor errors, these techniques perform inadequately under some conditions, allowing quadratic position errors to defocus the radar image.

It is advantageous, therefore, to have a control system which will add corrections when required and can adapt to the changing dynamics of the system to be controlled and to possibly wide variations in errors, in the absence of any a prior knowledge. It is additionally advantageous to have an adaptive learning control system which will operate with time-varying and non-linear systems and perform according to nonquadratic or quadratic performance criteria.

SUMMARY OF THE INVENTION

This invention provides an adaptive learning controller (ALC) useful for processing measured position signals which are measured on board an aircraft flying along a prescribed path. This processing can take place onboard the aircraft or later, using recorded signals. The ALC corrects faulty position measurements which lead to the quadratic phase errors primarily responsible for SAR image defocusing. The errors which can be accounted for by the present invention are unpredictable INS acceleration and/or velocity bias errors, and, indirectly, radar quadratic phase errors. In this manner, the present system can substantially reduce the SAR image defocusing effects caused by these errors.

In general, a system incorporating an inertial navigation system to determine its position, such as an SAR system, can use the ALC of the present invention to correct position measurements.

The ALC first samples and discretizes the system state function s and then uses reinforcement feedback to accomplish its purpose. There are two components in the ALC. The first component, by constructing associations between the measured position signal and the ALC-produced correction signal, continuously modifies the weighting system function, w, so as to enhance those inputs which lead to desirable outputs and deemphasize those inputs which cause undesirable outputs.

The second element generates the internal reinforcement signal r*. This signal, which includes the external reinforcement signal, r, provides reinforcement prior to exceeding the chosen system performance limits, based on a predicted likelihood of exceeding the limits in the future.

The corrected position signal, which results from adding the position correction to the measured position signal, is then recorded with the concurrent radar and elapsed time signals, to produce data with corrected image defocusing.

According to one aspect of the invention, an apparatus and method are provided for use with an inertial navigation system adapted to produce a position measurement signal by integrating both an acceleration measurement signal and the resulting velocity estimate signal. The apparatus generates velocity bias estimate and position correction signals in order to correct bias errors in the acceleration measurement signal. It comprises means for adding the position correction signal to the position measurement signal, thereby generating a corrected position signal, means for comparing the correction position signal to predetermined error criteria and generating a failure signal indicative of a failure of the corrected position signal to meet the predetermined error criteria and means, adapted to receive the corrected position signal and velocity bias estimate signal, for generating a system state signal. The apparatus further comprises an adaptive learning controller means, adapted to receive the failure signal and the system state signal, for generating an acceleration correction signal, means for integrating the acceleration correction signal to generate a velocity bias estimate signal, and means for integrating the velocity bias estimate signal to create the position correction signal. The method comprises the steps performed by the apparatus.

In the preferred embodiment of the present invention, the input signals subject to bias errors can, for example, be cross-range accelerations. It being known that the deviations of the cross-range position y of the aircraft carrying the SAR will lie within certain specified limits of a straightline trajectory, when these limits are exceeded, the external reinforcement function is activated. A weighting vector v weights the most recent component of the state vector X which is best correlated with the most recent value of the internal reinforcement function r*. The new value of the weighting vector v is applied to the binary state vector X (whose components are all 0's except for one 1). The newly computed internal reinforcement function r* is also passed to a correlator which computes the correlations between the measured position and the system's output state.

Based on the past values of the correlation of the measured position and the output state function, a new weighting vector w is computed. Its present value depends on its past value and the product of the internal reinforcement function and the previously established position-output state correlation. Using the weighting vector w to weight the output state vector X, and adding the corrupting noise, the resulting value is compared to a threshold. The threshold test generates the input variable correction, $Y_c$, which is chosen to be either a plus 1 or minus 1.

DETAILED DESCRIPTION OF THE PREFERRED EMBODIMENT

Figure 1:
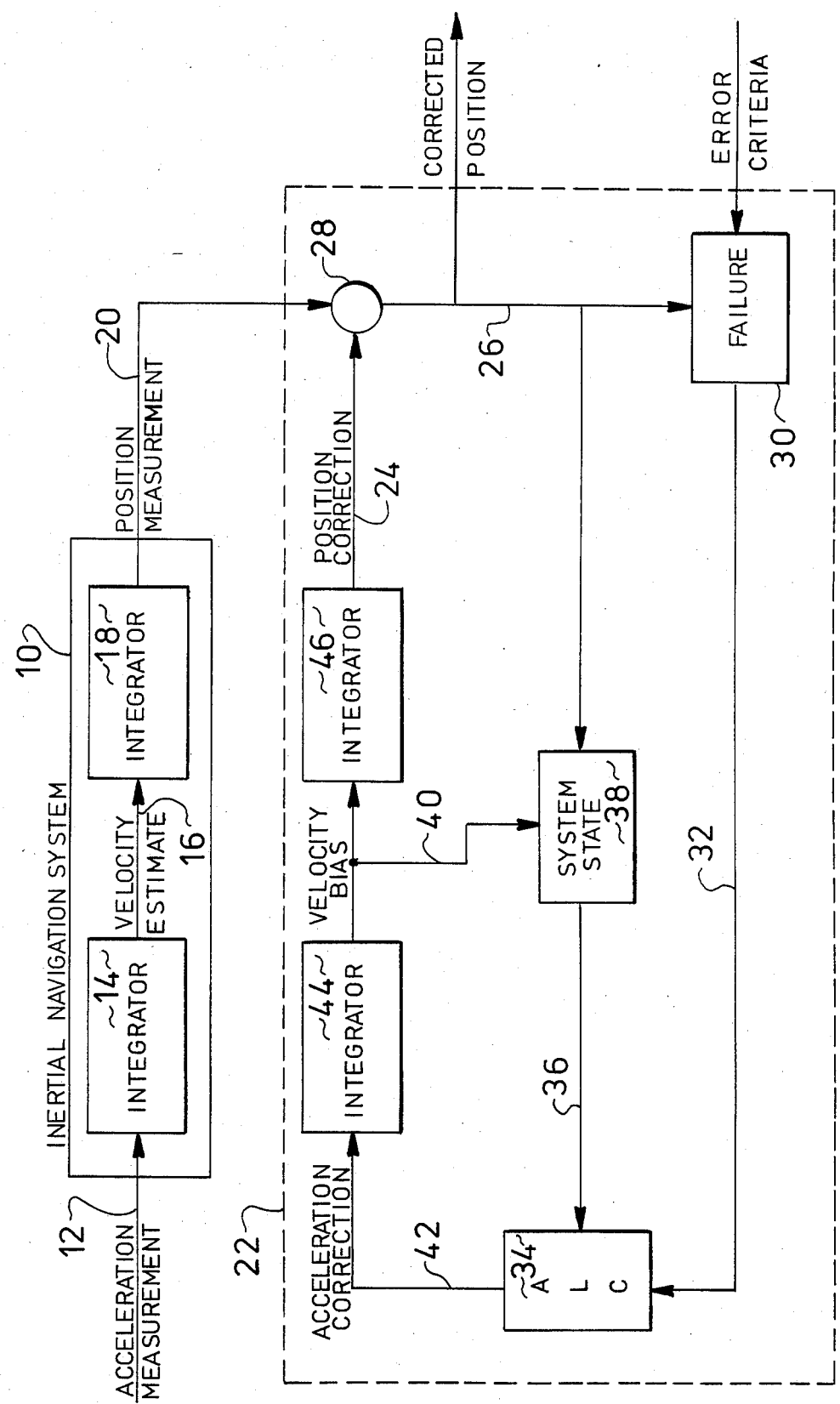
FIG. 1 is a block diagram of the overall structure of the inertial navigation system and the controller of the present invention.

Referring now to FIG. 1 of the drawings, one skilled in the art will appreciate that inertial navigation system 10 receives acceleration measurements over line 12 which are then integrated with respect to time in integrator 14. The output of integrtor 14 is a velocity estimate signal on line 16 which is fed to a second integrator 18. The velocity estimate signal is integrated with respect to time to produce a position measurement signal 20. The position measurement signal is the normal output of the inertial navigation system 10. To correct any errors in position measurement which may result from biases in acceleration measurement signal 12, system 22, the present invention, receives the position measurement signal from inertial navigation system 10 over line 20, adds a position correction signal from line 24, and produces a corrected position signal on line 26, which is the output of summer 28. In a synthetic aperture radar (SAR) application, the corrected position signal can be re-recorded on a magnetic tape containing radar measurements made at the corresponding time, to form a position corrected synthetic aperture radar data tape. In addition, the corrected position signal on line 26 is compared to a predetermined failure criterion 30. If failure criterion 30 indicates that a failure has occurred, a suitable signal is sent over line 32 to adaptive learning controller 34. Simultaneously, the adaptive learning controller is receiving a system state signal 36 produced by system state decoder 38. The inputs to system state decoder 38 are the corrected position signal 26 and a velocity bias signal 40 to be discussed in the following. The output of adaptive learning controller 34, an acceleration correction signal is sent over line 42 to integrator 44 which produces the velocity bias signal 40, serving as one of the inputs to system state decoder 38. Velocity bias signal 40 is also sent to integrtor 46 which produces position correction signal 24. Position correction signal 24 is added to position measurements 20 produced by inertial navigation system 10 to produce the corrected position signal 26.

Figure 2:
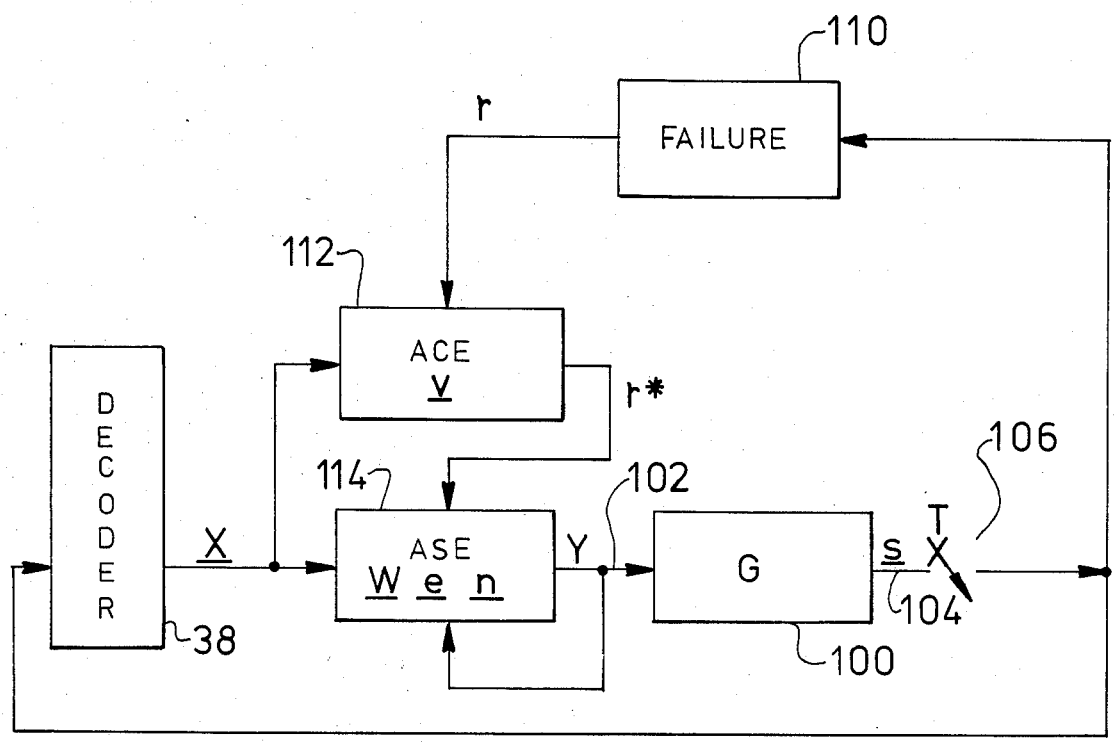
FIG. 2 is a block diagram of the controller of the present invention.

Referring now to FIG. 2 of the drawings, the invention is applied to the control of a system 100 which receives an input signal y on line 102 and produces an output signal s, which is a state function, on line 104. System 100 may, for example, be the system of an aircraft carrying an SAR. The state function s (a vector having a number of components) is sampled periodically by sampler 106, these vector samples being sent to a decoder 108 and a failure detector 110. Decoder 38 accepts the sampled state function s and produces a vector X whose number of components (N) is equal to the number of output states which system 100 will attain when functioning as desired.

All N components of the binary state vector X are equal to 0 except the component which corresponds to the current binary representation of the state of system 100. This component is set equal to 1.

Samples of state function s are also input to failure circuit 110. The external reinforcement signal, r, has a value of 0 unless the present value of s falls outside an acceptance band, in which case r is set equal to −1.

The Adaptive Critic Element (ACE) 112 accepts the values of r and the vector X. Beside computing the weighting vector v (used only within ACE 112), ACE 112 produces internal reinforcement function r* according to the formula:

$$r^*(k) = r(k) + \gamma p(k) - p(k-1) \tag{1}$$

where $$p(k) = \Sigma v_i x_i \tag{2}$$

and $\gamma$ is a non-negative constant less than or equal to 1. The weighting vector v (having components $v_i$, for $i = 1, \ldots, N$) is updated at time $t_k$ in accordance with the formula:

$$v_i(k+1) = v_i(k) + \delta r^*(k) \hat{x}_i(k) \tag{3}$$

where $\hat{x}_i(k)$ is calculated according to $$\hat{x}_i(k+1) = \beta \hat{x}_i(k) - (1-\beta) x_i(k) \tag{4}$$

and $\beta$ and $\delta$ are positive constants.

Because exactly one of the components of X, say, $x_l$ is equal to 1, the value of p(k) is equal to the current value of the lth component of weighting vector v (see equation 2). Therefore, the value of the internal reinforcement function r*(k) is the current value of the external reinforcement function, modified by the difference between 1) a constant times the component of the weighting vector v which corresponds to the present state of system 100 and 2) the last previous value of the vector v corresponding to the then current state of the system 100 (see equation 1). Each component of weighting vector v is updated according to the correlation between the last previous value of the internal reinforcement function r*(k) and the then current value of a trace of the ith component of the sampled state variable vector X (see equation 3). The trace of $x_i$ is determined in accordance with equation 4, where the value of each component of the trace is calculated as a linear combination of the last previous value of the trace $\bar{x}_i$ and the last value of the input variable $x_i$.

The Associative Search Element (ASE) 114 accepts the values of the current sampled output state vector X, the internal reinforcement function r*, and the fed-back value of its last output to compute its current output y. The value of y is either a plus or minus 1, depending on whether the sum of weighted components of the vector X and the current value of the system noise, n, is nonnegative or negative. The weighting vector w is updated by adding to each component of the weighting vector a measure of the correlation between the internal reinforcement function r* and eligibility function $e_i(k)$ in accordance with the following formula:

$$w_i(k+1) = w_i(k) + \alpha r^*(k) e_i(k), \text{ for } \alpha > 0. \quad (5)$$

The eligibility function $e_i(k)$ is updated in accordance with a weighted sum of the last previous value of the eligibility function and the correlation between the last previous input to the system and the ith component of the sampled system output, i.e., $$e_i(k+1) = \beta e_i(k) + (1-\beta)[y(k) x_i(k)], \text{ for } 0 < \beta < 1. \quad (6)$$

Figure 3:
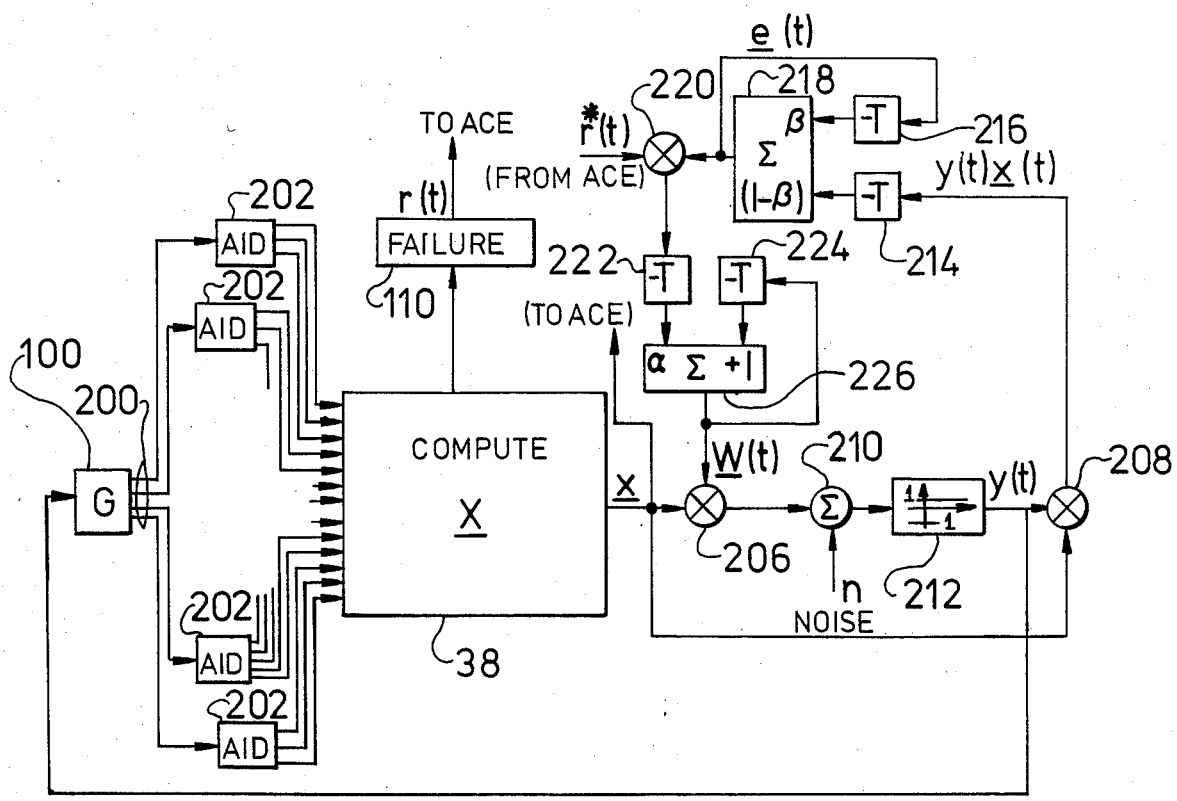
FIG. 3 is a block diagram of a specific embodiment of a first portion of the invention.

Referring now to FIG. 3 of the drawings, a more complete description of the operation of the ASE 114 will be given. System 100 produces a vector of analog outputs 200. Each component of this vector of outputs is sampled by an analog-to-digital (A/D) converter 202. These sampled values are all fed to state vector decoder 38, which produces the values of the discretized output state vector which triggers the failure detector 110. Decoder 38 generates the binary vector X which has only one component equal to 1. X goes to both vector multiplier 206 and scalar-vector multiplier 208.

The other input to multiplier 206 is the weighting vector w. These two vectors are multiplied by vector multiplier 206 and the resulting scalar is sent to adder 210. The other input to adder 210 is the noise contributed by the system 100. The output of adder 210 is then compared to 0 by threshold device 212, which outputs a +1 if the output of adder 210 equals or exceeds 0 and outputs a −1 otherwise. The output of threshold device 212, y(t), is fed back to the input of system 100 and also to the scalar input of scalar-vector multiplier 208. The resulting product is sent to delay device 214. A companion delay device 216 receives a fed-back value of the eligibility vector function e(t). The values of delay devices 214 and 216 are respectively multiplied by $1-\beta$ and $\beta$ and added together in vector summer 218. This is the current value of the eligibility function e(t).

The product of the internal reinforcement function r* and the eligibility vector function e(t) is computed in vector multiplier 220. These values are delayed by vector delay component 222 (which delays the value of its input by the sampling time interval, T), weighted by a factor $\alpha$, and added to a delayed version of weighting vector w through delay device 224 and vector adder 226. This value of weighting vector w is, as described above, multiplied with sampled output state vector X in vector multiplier 206.

Figure 4:
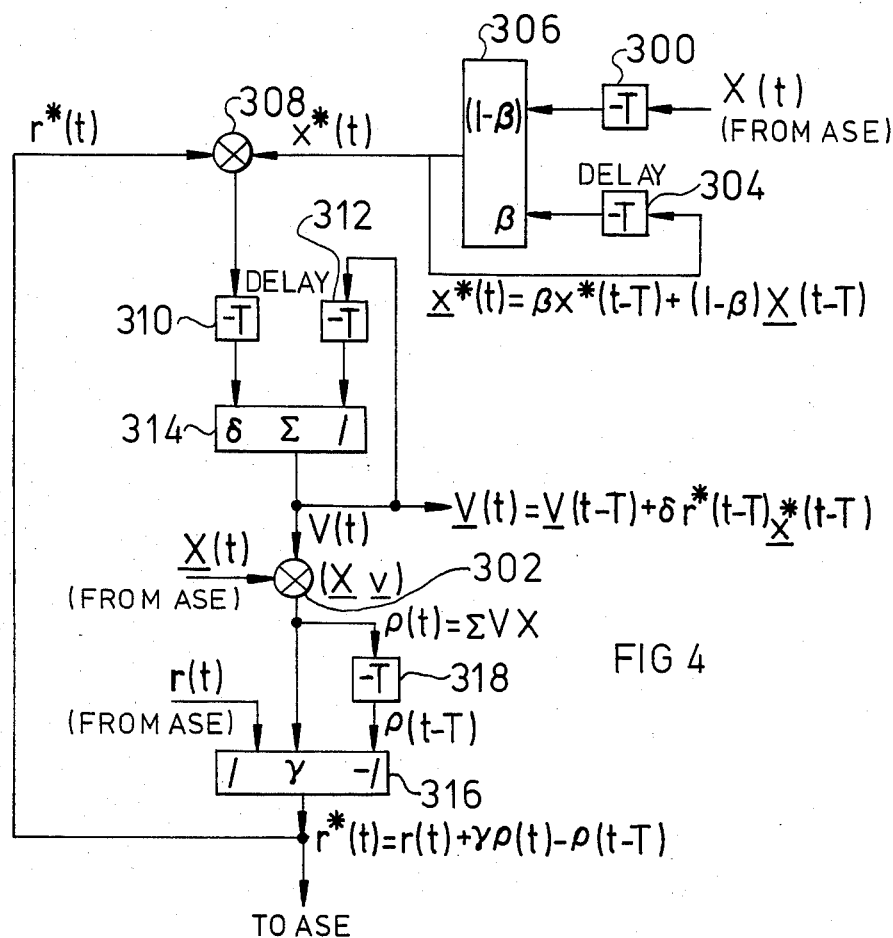
FIG. 4 is a block diagram of a second portion of the preferred embodiment of the invention.

Referring now to FIG. 4 of the drawings, the implementation of ACE 112 is shown. The value of the output state vector X is sent to delay device 300 and vector multiplier 302. Another vector delay device 304 accepts the output of vector adder 306. Vector adder 306 computes the componentwise sums of linearly weighted outputs of delay devices 300 and 304. The output of vector summer 306 is sent to vector multiplier 308, where it is multiplied componentwise with the fed-back value of internal reinforcement function r*. The outputs of vector multiplier 308 are sent to delay device 310. The value of weighting vector v is fed back to delay 312. Vector summer 314 componentwise adds the delayed values of weighting vector v and a scaled value of the output of delay device 310.

The weighting vector v is the second input to multiplier 302 whose output is sent to summer 316 and delay device 318. Also input to summer 316 is the value of reinforcement function r*(t) produced by failure device 110 (FIG. 2) and the delayed output of delay device 318. To the value of reinforcement function r(t) is added a weighted value of the output of vector multiplier 302 and is subtracted a delayed sample of the output of vector multiplier 302. The result is the internal reinforcement function r*(t). This value is fed back to multiplier 308 and fed to multiplier 220 in FIG. 3 of the drawings.

The adaptive learning controller (ALC) of the present invention exercises control over system 100 by maintaining the value of certain preselected components of the output state variable X within predetermined bounds. If, in the course of adapting and learning, one or the other of these state variables falls outside of these prescribed bounds, a failure has occurred and the value of the reinforcement function r(t) is set equal to −1. At all other times, r(t) is equal to 0.

From assumed initial values of 0 for the system's state variables, the weighting vectors w and v, the eligibility function e, and X the system 100 passes through a sequence of admissible states until a failure occurs. At this point, the system state variables and X are reset to zero but the weighting vectors w and v are unchanged. The values of these weighting vectors represent the learning of the system up to the point where a failure occurred. By not resetting the values of these weighting vectors, this experience is retained in the ALC and the system learns to operate without failure.

Figure 5:
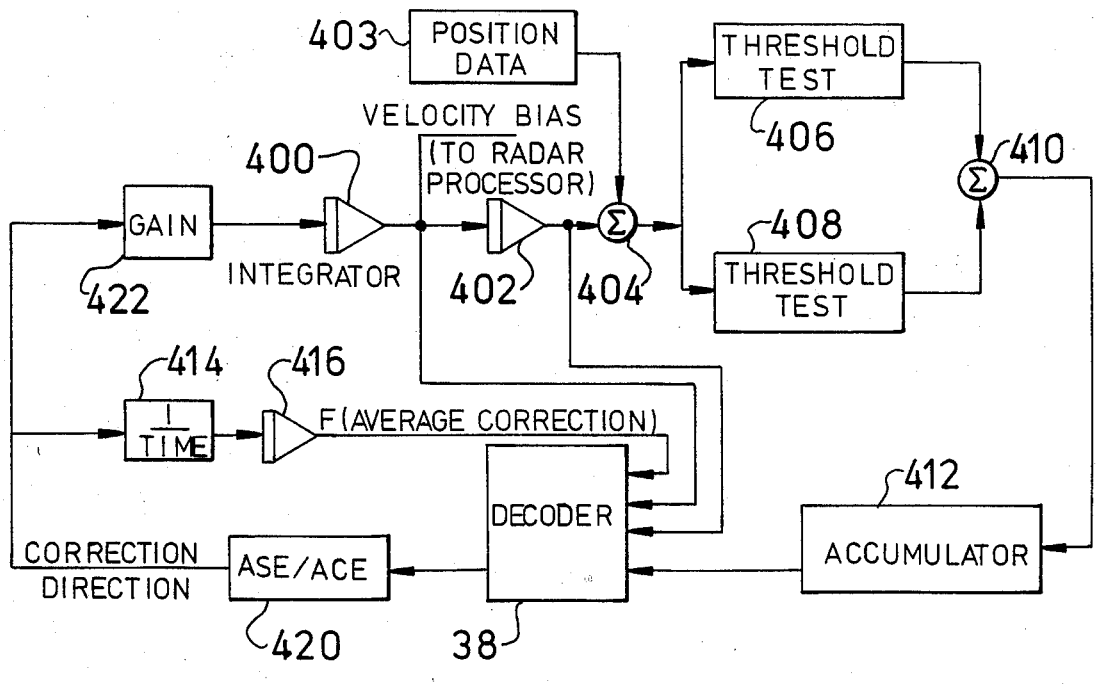
FIG. 5 is a block diagram of the specific embodiment of the invention as applied to synthetic aperture radar.

FIG. 5 of the drawings illustrates the application of the adaptive learning controller to a motion correction problem relating to synthetic aperture radars (SARs). Specifically, a SAR system installed in an airplane is assumed to travel a straight-line path while collecting data. There are, of course, deviations from this straight-line path and the present invention can be adapted to control the processing of the collected data to account for these path deviations. Departure from a straight-line path causes the range to radar signal-scattering objects to change during the course of collecting the data. Because data processing algorithms assume a straight-line path, these deviations lead to a defocusing effect on the images which result from processing the radar data. Of greatest concern are the cross-range deviations from a straight-line path, because these have the strongest effect on target range.

As shown in FIG. 5, integrator 400 integrates an acceleration correction (rate of change of velocity bias) to produce a velocity bias estimate $Y_c$. Integrator 402 integrates the velocity bias estimate $Y_c$ to produce a position correction $Y_c$. This position correction is subtracted from the position $Y-Y_o$ which was measured by the inertial navigation system at the current time and stored in data file 403. This subtraction is accomplished in adder 404.

The position produced by adder 404 is to be kept within certain predetermined upper and lower limits which define the expected limit of the deviation of the aircraft from its assumed straight-line path. Two threshold tests 406 and 408, corresponding to these upper and lower thresholds, $Y_b$ and $-Y_b$, respectively, are applied to the output of adder 404. At each point of time, a count is accumulated by accumulator 412 if either the upper threshold is exceeded at 406 or the lower threshold is exceeded at 408, the counts generated by threshold tests 406 and 408 being added in adder 410. These counts are accumulated by accumulator 412.

The output of accumulator 412 is regarded as one of the states of the SAR data processing system. The other system states used are: the position correction $Y_c$ which is output by integrator 402, the velocity bias estimate $Y_c$ produced by integrator 400, and a value which measures the average acceleration correction applied to the motion correction system. This average correction, F, is determined by dividing the plus or minus 1 output values of the ALC 420 by the elapsed time since the time of the last reset of ALC 420 and integrating the result in integrator 416. Upper and lower limits, $F_b$ and $-F_b$, respectively, are imposed on the values which F may assume. These four variables are fed to decoder 38, producing the binary sampled state vector X.

Adaptive learning controller 420 produces an output having values of either $+1$ or $-1$. Besides being fed to divider 414, these values are also sent to scaler 422 whose output is an acceleration (rate of change of velocity bias) to be integrated through integrator chain 400 and 402 to cause a correction in the measured position of the synthetic aperture radar.

Decoder 38 also serves as a failure detector. A failure is declared if either the output of accumulator 412 or the output of integrator 416 strays beyond permissible limits. When a failure is declared, the system state variables are reset to zero, as is the value of elapsed time used in calculating the average correction F.

It is apparent that various alternative embodiments of this invention may be set forth by those skilled in the art without departing from the spirit or scope of the following claims which are intended to encompass such alternative embodiments.

We claim:

1. For use with an inertial navigation system adapted to produce a position measurement signal by integrating both an acceleration measurement signal and the resulting velocity estimate signal, an apparatus for generating velocity bias estimate and position correction signals in order to correct bias errors in the acceleration measurement signal, comprising:

means for adding the position correction signal to the position measurement signal, thereby generating a corrected position signal;

means for comparing the corrected position signal to first predetermined error criteria and generating a first failure signal indicative of a failure of the corrected position signal to meet the first predetermined error criteria;

means, adapted to receive the corrected position signal and velocity bias estimate signal, for generating a system state signal;

adaptive learning controller means, adapted to receive the first failure signal, a second failure signal and the system state signal, for generating an acceleration correction signal in response thereto;

means for integrating the acceleration correction signal to generate the velocity bias estimate signal;

means for integrating the velocity bias estimate signal to create the position correction signal;

means for averaging the acceleration correction signal over a period of time; and means for comparing the time-averaged acceleration correction signal to second predetermined error criteria and generating a second failure signal indicative of a failure of the time-averaged acceleration correction signal to meet the second predetermined error criteria.

2. A method for processing data produced by a mobile radar system, the data comprising radar, elapsed time, and measured position signals, comprising the steps of:

(a) sampling the measured position, elapsed time, and radar signal data at discrete points in time;

(b) integrating a rate of change of velocity bias signal, thereby producing a velocity bias signal;

(c) integrating the velocity bias signal, thereby producing a position correction signal;

(d) subtracting the position correction signal from the measured position signal, thereby producing a corrected position signal;

(e) comparing the corrected position signal to a predetermined upper signal threshold and generating a positive count for each sample time when the corrected position signal exceeds the upper threshold;

(f) comparing the corrected position signal to a predetermined lower signal threshold and generating a negative count for each sample time when the corrected position signal falls below the lower threshold;

(g) accumulating the positive and negative counts produced in steps (e) and (f), to produce a first failure criterion signal;

(h) dividing the value of the rate of change of velocity bias by the value of the elapsed time and integrating the resulting signal to produce a second failure criterion signal;

(i) producing a state variable signal as a function of the values of the velocity bias, the position correction, and the first and second failure criteria signals;

(j) processing the state variable signal by an adaptive learning controller, responsive to failures signified by the first and second failure criteria independently exceeding predetermined first and second upper and lower failure bounds, for producing the two-valued rate of change of velocity bias signal; and (k) recording the radar, elapsed time, and corrected position signal data, whereby the radar signals and elapsed time signals are placed in correspondence with the corrected position signal data.

3. The method of claim 2, wherein the state variable signal produced in step (i) is a binary-valued vector signal, with exactly one component having a value of one and the remainder of the components having a value of zero.

4. The method of claim 2, wherein the two-valued rate of change of velocity bias signal takes on the values of $+a$ and $-a$, where a is a predetermined positive number.

5. The method of claim 2, wherein step (j) further comprises the steps of:
   (j1) receiving the state variable signal and the first and second failure criterion signals and producing an internal reinforcement signal $r^*$ in response thereto, the internal reinforcement signal conveying information concerning the value of the state variable and the existence of at least one failure; and
   (j2) receiving the state variable signal, the internal reinforcement signal $r^*$, and the next last value of the two-valued rate of change of velocity bias signal produced by this step, for constructing associations between the state variable and the rate of change of velocity bias signals.

6. The method of claim 5, wherein:
step (g) further comprises, when the value of the first failure criterion signal exceeds the predetermined first upper and lower failure bonds, the step of resetting the value of the first failure criterion signal to a predetermined first value; and
step (h) further comprises, when the value of the second failure criterion signal exceeds the predetermined second upper and lower failure bounds, the steps of resetting the value of the elapsed time to zero and resulting the value of the second failure criterion signal to a predetermined second value.

7. A method for producing recorded data produced by a mobile radar system, the data comprising radar, elapsed time, and measured position signals Y, comprising the steps of:
   (a) sampling the measured position, elapsed time, and radar signal data at uniformly separated discrete points in time;
   (b) integrating a rate of change of velocity bias signal V thereby producing a velocity bias signal $\dot{Y}_c$;
   (c) integrating the velocity bias signal $\dot{Y}_c$, thereby producing a position correction signal $Y_c$;
   (d) subtracting the position correction signal $Y_c$ from the measured position signal Y, thereby producing a corrected position signal $Y-Y_c$;
   (e) comparing the corrected position signal to a predtermined upper signal threshold $Y_b$ and generating a positive count of 1 for each sample time when the corrected position signal exceeds the upper threshold;
   (f) comparing the correction position signal to a predetermined lower signal threshold $-Y_b$ and generating a negative count of $-1$ for each sample time when the corrected position signal falls below the lower threshold;
   (g) accumulating the positive and negative counts produced when the corrected position signal exceeds the positive threshold $Y_b$ or falls below the negative threshold $-Y_b$, respectively, to produce a first failure criterion signal E, and, when the value of the first failure criterion signal E exceeds predetermined first upper and lower failure bounds $E_b$ and $-E_b$, resetting the value of the first failure criterion signal E to a value of zero;
   (h) dividing the value of the rate of change of velocity bias by the value of the elapsed time and integrating the resulting signal to produce a second failure criterion signal F, and when the value of the second failure criterion signal F exceeds the predetermined second upper and lower failure bounds $F_b$ and $-F_b$, resetting the value of the elapsed time to zero and resetting the value of the second failure criterion signal to zero;
   (i) producing a binary state variable vector X, the state variable having N states which are functions of the values of the velocity bias $Y_c$, the position correction $Y_c$, and the first and second failure criteria, E and F, such that X has N binary components at the time of the kth sample, $x_i(k)$, for $i=1$ to N, exactly one of the components having the value of one, the remainder of the components having a value of zero;
   (j) receiving the binary state variable vector X, the first failure criterion signal E, and the second failure criterion F, and producing an internal reinforcement signal $r^*$ in response thereto in accordance with the following formulas, applicable at the kth time sample:

$$r^*(k) = r(k) + \gamma p(k) - p(k-1)$$
$$p(k) = \Sigma v_i x_i$$
$$v_i(k+1) = v_i(k) + \delta\, r^*(k)\hat{x}_i(k)$$
$$x_i(k+1) = \beta \hat{x}_i(k) + (1-\beta)x_i(lx), \text{ and}$$

$\gamma$ is a non-negative constant less than 1, $\beta$ and $\delta$ are positive constants;
   (k) receiving the binary state variable vector X, the internal reinforcement signal $r^*$, and the next last value of the two-valued rate of change of velocity bias signal produced by this step, in accordance with the following formulas:

$$y(k) = \begin{cases} +1, & \text{if } \Sigma w_i x_i + n(t) \geq 0 \\ -1, & \text{if } \Sigma w_i x_i + n(t) < 0, \end{cases}$$

$$w_i(k+1) = w_i(k) + \alpha r^*(k)e_i(k),$$

$$e_i(k+1) = \beta e_i(k) + (1-\beta)\,[y(k)x_i(lx)],$$

$\alpha$ is a positive constant, and $0 < \beta < 1$; and
   (l) recording the radar, elapsed time, and corrected position signal $(Y-Y_c)$ data,
whereby the radar signals and elapsed time signals are placed in correspondence with the corrected position signal data.

* * * * *